United States Patent
Von Helmolt et al.

(10) Patent No.: US 9,704,121 B2
(45) Date of Patent: Jul. 11, 2017

(54) PRODUCT ALLOCATION INTERFACE

(75) Inventors: Hans-Ulrich A. Von Helmolt, Heidelberg (DE); Andreas Huber-Buschbeck, Heiligkreuzsteinach (DE)

(73) Assignee: SAP SE, Walldorf (DE)

(*) Notice: Subject to any disclaimer, the term of this patent is extended or adjusted under 35 U.S.C. 154(b) by 1006 days.

(21) Appl. No.: 13/537,972

(22) Filed: Jun. 29, 2012

(65) Prior Publication Data

US 2012/0278206 A1 Nov. 1, 2012

Related U.S. Application Data (63) Continuation of application No. 12/065,885, filed as application No. PCT/EP2005/054433 on Sep. 7, 2005, now Pat. No. 8,214,267.

(51) Int. Cl.
| | | |
|---|---|---|
| *G06G 1/14* | (2006.01) | |
| *G06Q 20/00* | (2012.01) | |
| *G06Q 10/08* | (2012.01) | |
| *G06Q 20/20* | (2012.01) | |
| *G06Q 30/06* | (2012.01) | |
| *G06Q 10/00* | (2012.01) | |

(52) U.S. Cl.
CPC ....... *G06Q 10/087* (2013.01); *G06Q 10/0875* (2013.01); *G06Q 20/203* (2013.01); *G06Q 30/0601* (2013.01); *G06Q 30/0605* (2013.01); *G06Q 30/0633* (2013.01); *G06Q 30/0639* (2013.01)

(58) Field of Classification Search
USPC .................................................. 705/22, 28
See application file for complete search history.

(56) References Cited

U.S. PATENT DOCUMENTS

| | | | | |
|---|---|---|---|---|
| 5,555,388 | A * | 9/1996 | Shaughnessy | G06F 17/30171 707/999.002 |
| 6,023,683 | A * | 2/2000 | Johnson | G06Q 10/087 705/1.1 |
| 2001/0032281 | A1 * | 10/2001 | Daynes | G06F 9/52 710/200 |
| 2002/0128913 | A1 * | 9/2002 | Ower | G05B 19/41865 705/22 |
| 2002/0165804 | A1 * | 11/2002 | Beebe | G05B 19/41865 705/28 |
| 2003/0036981 | A1 * | 2/2003 | Vaughan | G06Q 10/02 705/28 |

(Continued)

*Primary Examiner* — Ig T An (57) ABSTRACT

A computer-implemented framework and method for maintaining product allocation data objects comprising a plurality of product allocation data objects, a plurality of software modules, an interface for the software modules, and a plurality of computer-applications, wherein the product allocation data objects are representative of product allocations for several participants within an e-business system, wherein a product allocation data object is processed by at least one of the plurality of computer-applications, the software modules providing access to the product allocation data objects, and the interface provides concurrent access to the software modules for online collaboration, wherein a collaborative planning process of the product allocation data objects is executed by the software modules and controlled by the applications.

12 Claims, 6 Drawing Sheets

(56) References Cited

U.S. PATENT DOCUMENTS

| | | | | |
|---|---|---|---|---|
| 2003/0074390 A1* | 4/2003 | Hudson | | G06F 9/3004 718/108 |
| 2003/0191698 A1* | 10/2003 | Brown | | G06Q 10/087 705/28 |
| 2003/0227392 A1* | 12/2003 | Ebert | | G06K 17/00 340/8.1 |
| 2004/0117531 A1* | 6/2004 | McKenney | | G06F 9/52 710/200 |
| 2007/0050206 A1* | 3/2007 | Whikehart | | G06Q 10/04 705/2 |
| 2007/0174146 A1* | 7/2007 | Tamarkin | | G06Q 10/087 705/28 |

\* cited by examiner

PRODUCT ALLOCATION INTERFACE

CROSS REFERENCE TO RELATED APPLICATION

This application is a continuation of pending U.S. patent application Ser. No. 12/065,885, filed Mar. 5, 2008, entitled, PRODUCT ALLOCATION INTERFACE.

BACKGROUND OF THE INVENTION

The present invention relates generally to methods and systems for managing inventory. More particularly, the present invention relates to methods and systems for managing product allocations of an inventory within a supply chain management system. One aspect of this invention is the support of a collaborative planning process for product allocations using a product allocation interface.

Today, the success of a business company depends essentially on the requirement that customer demands on goods and/or services be fulfilled precisely, cost-efficiently and in time. Therefore, many companies make use of a supply chain management system to control and optimize their production and delivery processes.

Supply chain management may comprise the process of controlling the flow of goods, services, information and/or finances between the involved parties such as manufactures, suppliers, wholesalers, retailers, and consumers. This process may include, among others, order processing, information feedback, and timely delivering the ordered goods and/or services.

One part of supply chain management is the maintenance of an inventory in several warehouses, wherein the warehouses may be located with each participant, which is involved in the supply chain, e.g., manufacturer, dealer or middleman. An inventory of goods is understood here to comprise all goods being on stock at a specific time. In this supply chain, a participant can act either as a supplier or as a customer.

Any inventory shortage in the supply chain could have negative effects on the efficiency of the business, including production delays, missed order deadlines or disability to meet customers demands. In order to avoid such negative effects, the concept of product allocations is used within supply chain management.

State of the Art

In current supply chain management systems the product allocation data is maintained centralized by one of the participants of the supply chain. Other participants within the supply chain do not have access to this product allocation data.

SUMMARY

In general, in one aspect, this invention provides a computer-implemented framework for maintaining product allocation data objects within an e-business system, the framework comprising a plurality of product allocation data objects which are representative of allocations of products, a plurality of software modules, an interface for accessing the plurality of software modules, a plurality of computer systems and a plurality of data storages, wherein each product allocation data object is assigned to a product;

each software module provides access to at least one of the plurality of product allocation data objects;

each product allocation data object is processed by one of the plurality of software modules;

a product allocation data object is stored in a data structure within at least one of the data storages; and the interface provides concurrent access for the plurality of computer systems to the plurality of software modules.

The product allocation data objects, which are stored within an e-business system, e.g. a supply chain management system, may be processed by several computer systems. These computer systems may also be e-business systems. Processing the product allocation data objects by using a usual commercially available computer application is also possible. To this end, the framework provides an interface for accessing the product allocation data objects. Many computer systems may access the product allocation data object over this interface at the same time. Therefore, a collaborative planning process may be realized according to this invention.

Further embodiments of the invention comprise the following features.

In one embodiment of the invention, a product allocation data object comprises a plurality of combinations of characteristic values wherein such a product allocation data object is configurable in its combination of the plurality of characteristic values and a plurality of time series.

A new product allocation data object can be created within the framework or an existing product allocation data object can be customized according to the combination of the characteristic values.

If a new product allocation data object is created within the framework, the framework generates automatically a new data structure and a new software module for the new product allocation data object. For a reconfigured or changed product allocation data object the framework also generates automatically a new data structure and a new software module.

One advantage is that the framework creates automatically new software modules according to new created or changed product allocation data objects. The respective data structures are also created automatically by the inventive framework. Therefore, a manually customizing of the framework is not necessary even if the product allocation data object changes.

Further, the framework alters automatically the interface according to a new generated software module and data structure by creating a new mapping between the interface and the new generated software module.

Because of the automatically created mapping between the interface and the software modules, the interface does not change the outward appearance. One advantage of this fact is that the computer systems do not have to change their access to the interface if a new product allocation data object is created or an existing product allocation data object is changed.

Yet further, the framework deletes automatically the respective software module and data structure for a deleted product allocation data object. The framework also alters automatically the interface according to the deleted software module and data structure by deleting the respective mapping between the interface and the deleted software module.

In a further embodiment the software modules comprise at least one of the following methods for updating a product allocation data object by updating the corresponding combination of characteristic values and time series;

reading a product allocation data objects by reading the corresponding combination of characteristic values and time series;

searching the plurality of data storages for at least one product allocation data object according to one or more search criteria;

locking a product allocation data object; and unlocking a product allocation data object.

All necessary methods for managing product allocation data objects are provided by the framework. In addition to these methods, the framework also provides methods to prevent a concurrent access to a product allocation data object by two different computer systems.

The plurality of computer systems are connected by a communication network with the interface in order to access the software modules.

The time series comprises one or more time periods, a number representative of the planned allocation quantity of a product, a number representative of the sold quantity of a product and a key representative of an allocation planning object. A combination of characteristic values is identified by a key representative of an allocation planning object. A time series is linked with a combination of characteristic values by the allocation planning object.

A product allocation data object further comprises a plurality of allocation planning objects representative of the assigned combinations of characteristic values.

Therefore, a product allocation data object and its values like planned allocation quantity and sold quantity may vary over time.

In a further embodiment a product allocation data object is loaded together with the assigned combinations of characteristic values and time series from the data storages into a memory during the first access by one of the software modules.

If a product allocation data object is already in the memory the framework reads them from the memory for further processing.

Reading the product allocation data object directly from the memory leads to a better performance.

Furthermore, the invention provides a method performing the following steps:
 a first step of receiving a request for processing at least one product allocation data object from the plurality of computer systems over the interface;
 a second step of checking as to whether the product allocation data object is located on the data storage or on the memory; and
 a third step of processing the product allocation data object according to the received request.

The second step may further comprise sub-steps of
reading the product allocation data object together with the assigned combinations of characteristic values and time series from the data storage, if the product allocation data object is not available in the memory;

storing the read product allocation data object together with the assigned combinations of characteristic values and time series in the memory; and reading the product allocation data object together with the assigned combinations of characteristic values and time series from the memory.

The third step may further comprise
a first sub-step of locking the product allocation data object;
a second sub-step of processing the product allocation data object; and a third sub-step of unlocking the product allocation data object.

The second sub-step may further comprise at least one of the following steps:
 updating a product allocation data object by updating at east one combination of characteristic values or time series;
 reading a product allocation data object by reading a combination of characteristic values or time series; and
 searching the plurality of data storages or/and the memory for one ore more product allocation data objects according to one or more search criteria;

The locking step is performed before executing the update-method.

The unlocking step is performed after executing the update-method.

The locking step and the unlocking step may be performed by the update-method.

The locking and the unlocking step both may be executed implicitly and explicitly.

The locking step inserts an ID representative of a product allocation data object into a locking-list, wherein the locking-list stores all locked product allocation data objects, and, the unlocking step removes an ID representative of a product allocation data object from a locking-list.

The locked product allocation data objects are managed by using a locking list.

Yet further implemented may be a step of generating a new software module and a new data structure according to a new product allocation data object or according to an updated product allocation data object, a step of deleting a software module and a data structure according to a deleted product allocation data object, a step of altering the interface according to a new generated software module and a new data structure and a step of altering the interface according to a removed software module and a data structure. The step of generating a new software module and a new data structure is not accessible via interface.

Furthermore, the invention comprises a computer readable storage medium comprising program code for performing the inventive methods, when loaded into a computer-system.

Thus, the invention provides an uniform interface for third party software for managing a plurality of product allocation data objects within a collaborative planning process between a plurality of participants within a supply chain.

BRIEF DESCRIPTION OF DRAWINGS

The accompanying drawings, which constitute a part of this disclosure, illustrate various embodiments and aspects of the present invention and, together with the description, explain the principles of the invention.

In the drawings.

DETAILED DESCRIPTION

A product allocation defines a specific quantity of a product according to a combination of several characteristic values. A characteristic value may be the product, the customer or the customer group. A product allocation may be time-dependent, which means, that the quantity of products may vary over time. By defining and managing product allocations, the supply chain management system can avoid a situation where a customer allocates the entire available quantity of products, and subsequent orders from other customers cannot be confirmed by the system.

Figure 1:
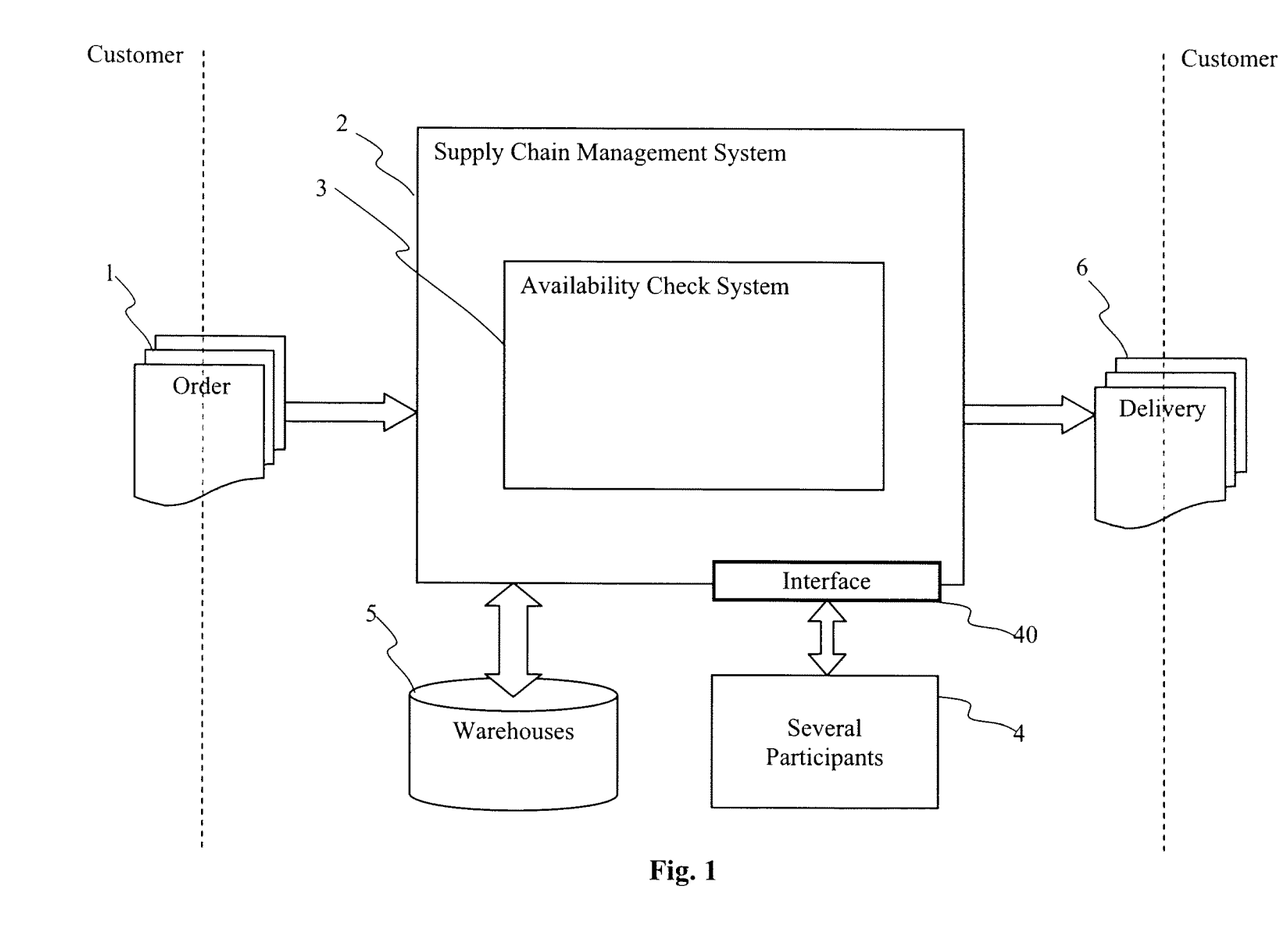
FIG. 1 illustrates a typical sourcing process of products within a supply chain management system.

FIG. 1 shows a typical sourcing process of products. The customer sends an order 1 to the dealer. The order 1 may be an electronic order transmitted by email or a traditional order transmitted by mail. The order comprises at least information about the required product and quantity. The dealer feeds the order information into the supply chain management system 2 which processes this order 1 and provides information for the product delivery step 6.

Within the supply chain management system 2, a check 3 is performed as to whether the required product and quantity is available. More precisely, this availability check 3 comprises a step of verifying whether the required quantity of products is available in the warehouses 5. The availability check 3 processes product allocation data objects which are stored within the supply chain management system 2. By processing product allocation data objects, a situation can be avoided where e.g. one of the customers allocates the entire quantity of products stored in the warehouses. Then, an urgent subsequent order from another customer could not be delivered because the entire quantity of products has been allocated by the first customer.

The product allocation data objects are maintained within the supply chain management system 2. Several participants 4 at the supply chain, e.g. manufacturer, dealer or middleman of the products, can maintain their own product allocation data objects within the supply chain management system 2. To this end, an interface 40 to these product allocation data objects is provided.

Figure 2:
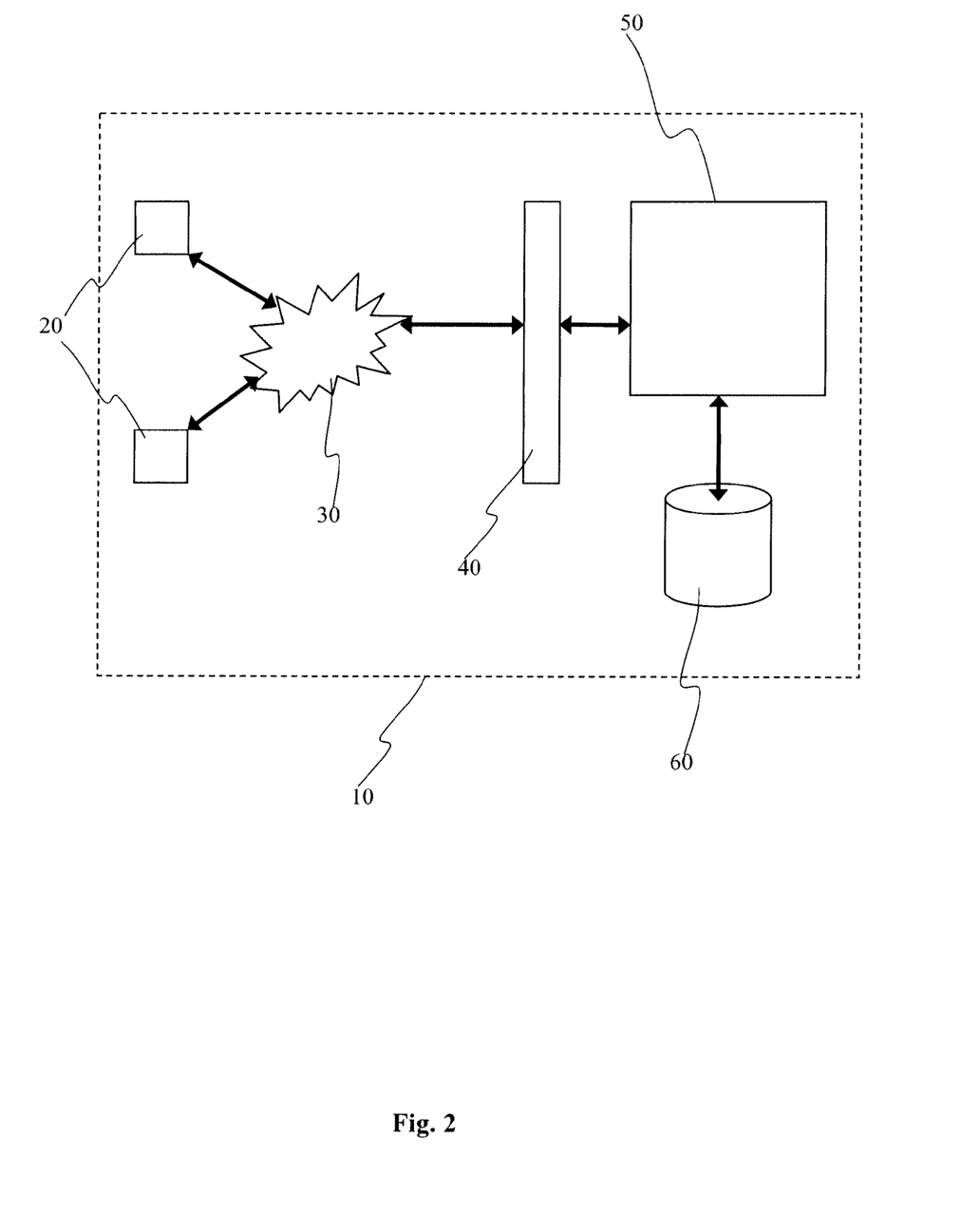
FIG. 2 illustrates an embodiment of the inventive framework.

FIG. 2 shows a preferred embodiment of the inventive framework 10. The framework 10 comprises a plurality of computer systems 20 which are located with the participants 4 (FIG. 1).

The computer systems 20 are connected by a communication network 30 with the interface 40. The communication network 30 may be a local area network (LAN), a wide area network (WAN), the inferno or a wireless communication network. The interface 40 provides access to the product allocation management software 50. In this embodiment both the interface 40 and the product allocation management software 50 are located on a server-system. The product allocation management software 50 comprises software modules for accessing the product allocation data objects stored in data storages 60. The data storages 60 may be located on different computer or server systems. The product allocation data objects are processed by at least one of the computer systems 20. Furthermore, the interface 40 provides concurrent access to the software modules. Using this interface 40, a collaborative online planning process is realized, wherein the planning process is executed by the computer systems 20 and controlled by the software modules within the product allocation management software 50. During a collaborative online planning process several participants 4 (FIG. 1) may process the product allocation data objects at the same time.

In another embodiment, a computer system 20 may be located on the same system as the interface 40 and the product allocation management software 50. In this case no separate communication network 30 is required.

The product allocation data objects depend on one or more characteristic values, e.g. customer type and/or order type. The product allocation data objects are maintained as time series, wherein each meaningful combination of characteristic values has its own time series. Each time series comprises one or more time periods wherein for each time period the product allocation data objects e.g. planned allocation quantity and sold quantity are maintained. In this embodiment, the time period within a time series is set to 'month'. Other time periods can be used, e.g. 'week' or 'quarter'. A larger time period will reduce the maintenance effort for the time series. In this manner, product allocation data objects can vary from time period to time period. These time series are also used to estimate a demand forecast of required quantities of products.

A plurality of such product allocation data objects are stored in the data storages 60. Each of these product allocation data objects represents a product allocation for a product. Within the supply chain management system, each product allocation data object is assigned to exactly one product whereas one product can have several product allocation data objects assigned thereto.

A product allocation data object comprises at least the following data items which are stored in a data structure:
 a key ID representative of the product allocation data object (Entry 1)
 a plurality of allocation planning objects (Entry 2 to n)

The key ID (Entry 1) is preferably a unique identifier of the product allocation data object. The plurality of allocation planning objects are representative of the assigned allocation planning objects (characteristic values and time series) to the product allocation data object.

Characteristic values are used to describe and differentiate the product allocation about objects. Therefore, a plurality of characteristic values describe the property of a product allocation data object. Characteristic values may be 'customer type', 'order type', 'product location', 'customer', 'weight' or 'priority of an order', for example.

The combination of the characteristic values is unique within the product allocation data objects which are assigned to a product. If for a product the characteristic values 'customer', 'order type' and 'product location' are available, one combination of characteristic values may be 'customer/order type'. Another combination of characteristic values may be 'order type/product location'.

Using the combination 'customer/order type', the supply chain management system can manage which quantity of a product a customer is allowed to order according to a specific order type within a specific time period. 'Order type' may be 'normal order' or 'emergency order'. In one embodiment, a product allocation data object provides for an 'emergency order' a larger quantity of a product within a time period than for a 'normal order'.

Figure 3:
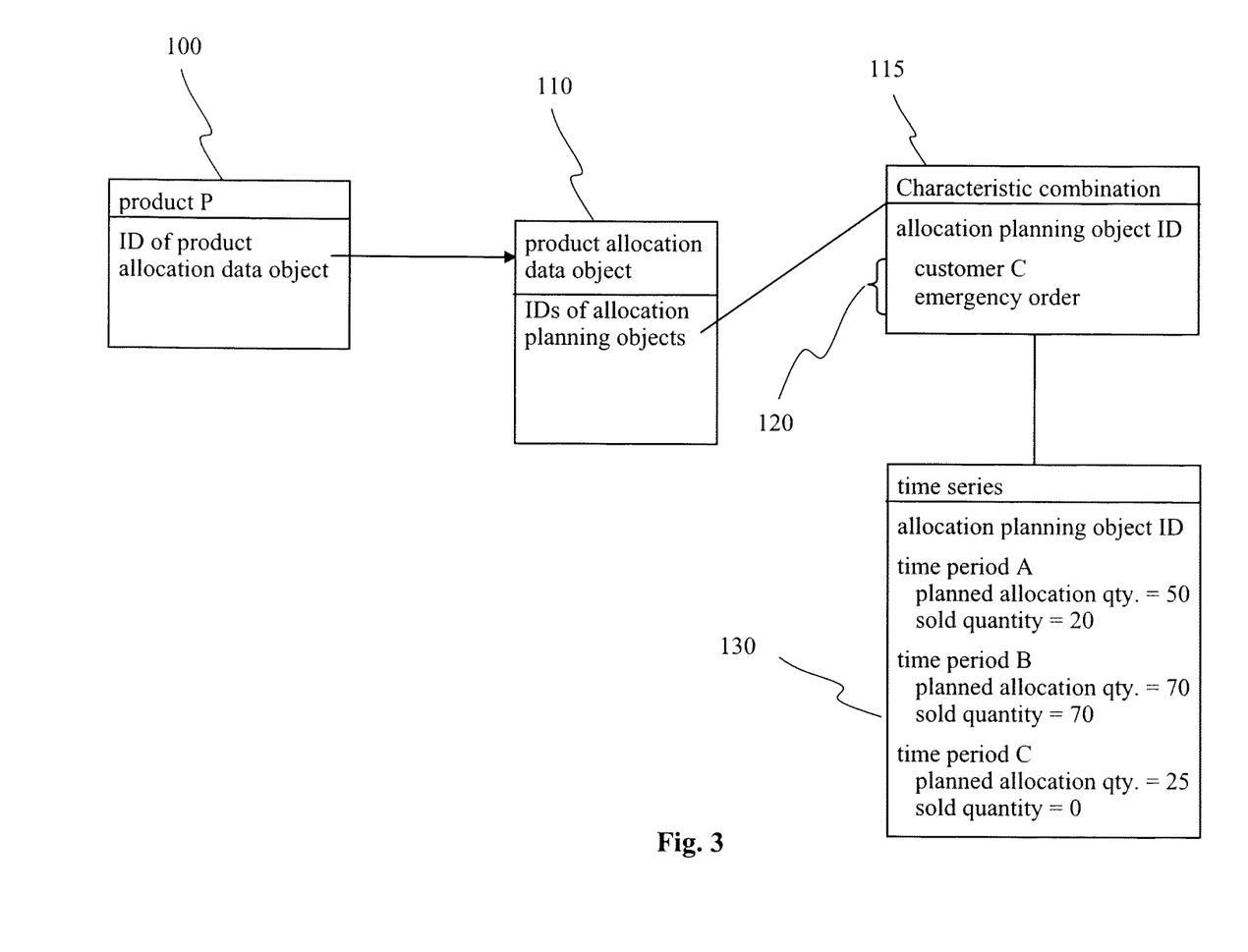
FIG. 3 illustrates a more detailed embodiment of the software-module-part according to FIG. 2.

The following example, shown in FIG. 3, demonstrates the usage of the product allocation data object and the respective time series for a product.

The product allocation data object 110 describes the product allocation which is assigned to 'product P' 100. The product allocation data object 110 comprises a plurality of IDs of allocation planning objects. The characteristic combination 115 stores a plurality of combinations of characteristic values. Each characteristic combination is identified by an allocation planning object ID. The entries 'customer C' and 'emergency order' represent a combination of the characteristic values 120. The time series 130 stores data about a plurality of time series. Each entry is identified by an allocation planning object ID. In this example, the time series stores data about three different time periods (A, B and C) according to the allocation planning object ID. The time series 130 is linked with the characteristic combination 115 by the allocation planning object ID. The characteristic combination 115 is linked with the product allocation data object 110 by the allocation planning object ID. Therefore, a product comprise a product allocation data object, wherein the product allocation data object may comprise a plurality of allocation planning object IDs of characteristic combinations and time series associated to the characteristic combinations.

Within the first time period 'time period A', there are planned 50 units and already sold 20 units of product P. Thus, 'customer C' is allowed to place an order of maximum 30 units of 'product P' within the first time period A.

Within the second time period 'time period B', customer C' has ordered 70 units out of the planned allocation of 70 units. Thus, no more units of 'product P' are available for the 'customer C' in that time period.

Within the third time period 'period C', the whole quantity of the planned allocation quantity of 25 is still available for 'customer C'

In this example, the available quantity of products for a customer within a specified time period is determined by calculating the difference between the planned allocation quantity and the sold quantity.

Figure 4:
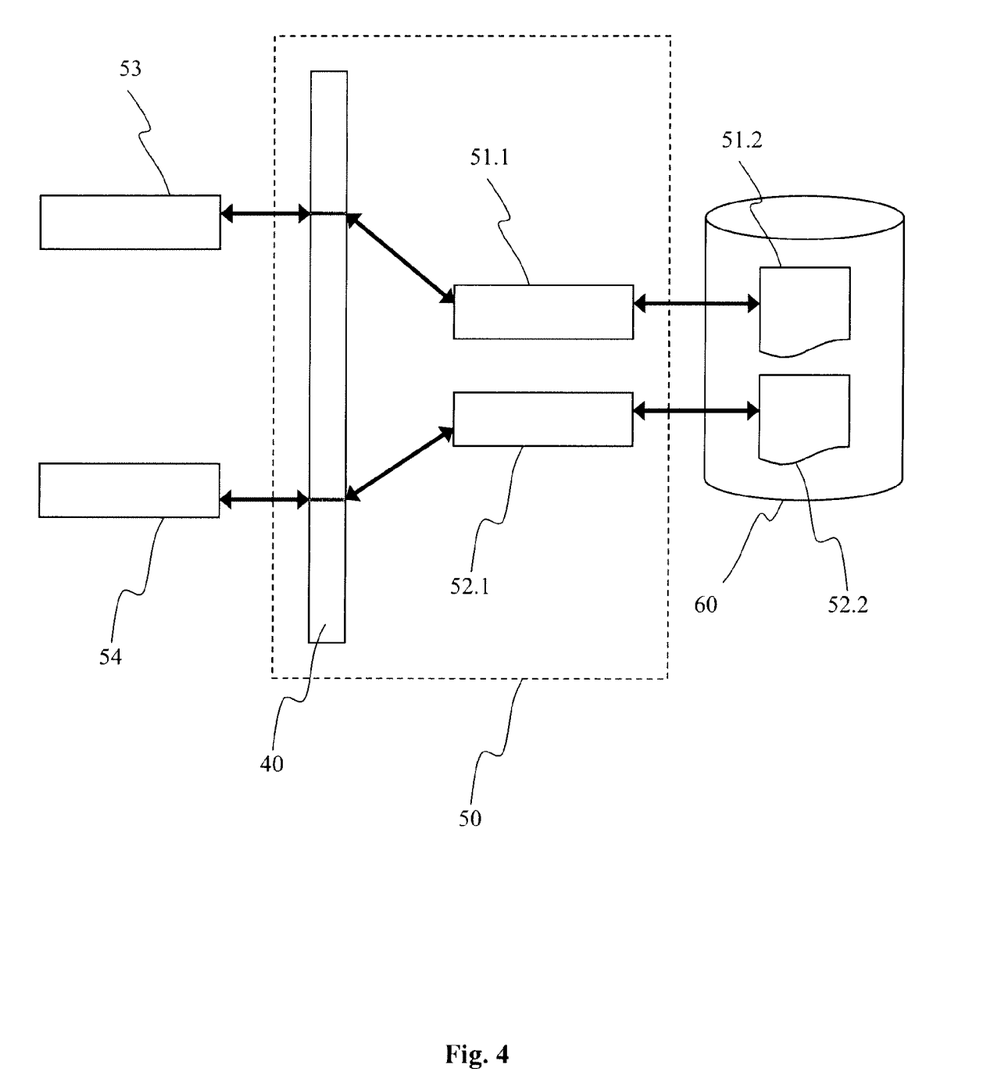
FIG. 4 illustrates the basic steps of the inventive method for maintaining product allocation data objects.

FIG. 4 shows a detailed embodiment of the product allocation management software 50 according to FIG. 2. In this embodiment, the interface 40 is part of the product allocation management software 50. The product allocation management software 50 comprises a plurality of software modules. FIG. 4 shows two software modules 51.1 and 52.1. Other embodiments may comprise more or less of these two software modules. Each of these software modules 51.1 and 52.1 is assigned to a product allocation data object 51.2 and 52.2 stored in the data storage 60.

The software modules 51.1 and 52.1 comprise a plurality of operations for maintaining the product allocation data objects 51.2 and 52.2. The access to the data storage 60 may be a direct access or an access using a data access layer.

A product allocation data object is configurable in its combination of characteristic values. If a product allocation data object is changed or a new product allocation data object is created, the framework creates a new software module and new data structures for the new or changed product allocation data object. The data structures store the above mentioned data about the product allocation data object and the respective time series. Furthermore, the framework 10 alters the interface 40 according the new generated software module by creating a mapping between the interface 40 and the new software module.

FIG. 4 shows two computer systems 53 and 54 accessing the software modules 51.1 and 52.1. The computer system 53 sends a request for processing the product allocation data object 51.2. The interface 40 maps this request to the software module 51.1 which executes the requested operation. The request of the computer system 54 is mapped to the software module 52.1 for processing the product allocation data object 52.2.

Seen from the outside the interface does not change, if a new software module is created. The computer systems have to send, together with the request, an identifier of the product allocation data object, to allow the interface performing the proper mapping of the request to the respective software module.

If a product allocation data object is removed, the framework 10 removes the assigned software module and data structures. The respective mapping for the interface is also removed.

Furthermore the product allocation management software 50 comprises additional processes, not shown in this figure, for managing a memory in which a product allocation data object is moved from the data storages 60, if the product allocation data object is processed for the first time by one of the software modules 51.1 and 52.1. If a product allocation data object is already located in the memory, the software modules 51.1 and 52.1 read this product allocation data object from the memory for further processing.

At least one of the following operations are provided by the additional processes 51.1, 52.1:

inserting a product allocation data object into the data storages 60;

deleting or removing a product allocation data object from the data storages 60;

reading a product allocation data object from the data storages 60;

updating a product allocation data object; and searching the data storages for one or more product allocation data objects according to one or more search criteria.

Figure 5:
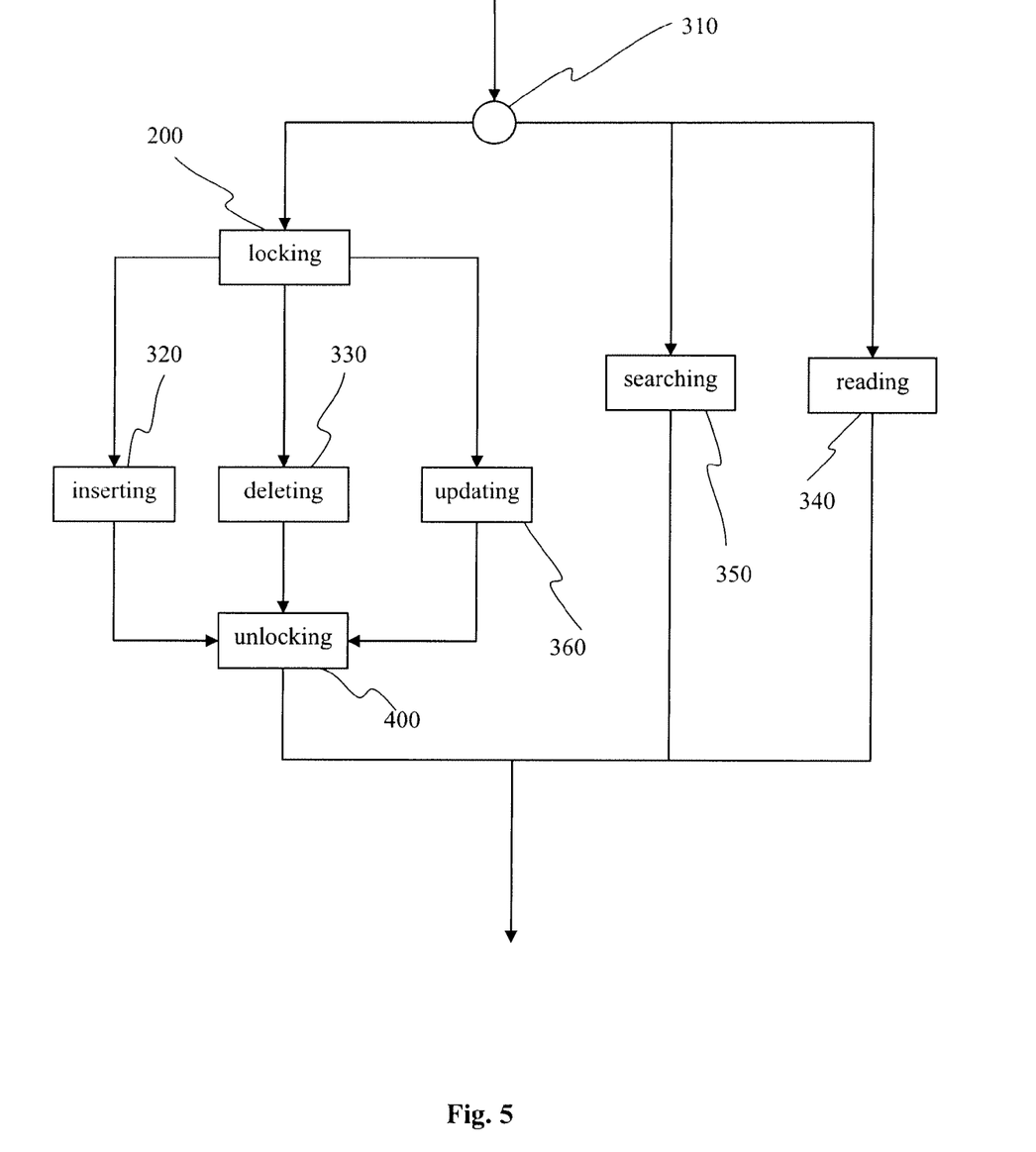
FIG. 5 illustrates a program flow for the access to the product allocation data objects.

FIG. 5 shows the basic steps of the inventive process for maintaining product allocation data objects. The process begins with a step of decision 310. In this step 310 it is decided whether the requested product allocation data object has to be locked or not.

If the product allocation data object has to be locked, the process continues with step 200.

Step 200 comprises locking the product allocation data object. Locking a product allocation data object means that this product allocation data object cannot be accessed by any other computer system. Thus, the subsequent steps 320, 330 and 360 have an exclusive access to this locked product allocation data object during the processing.

Step 200 is followed by one of the following steps:

step 320 of inserting a product allocation data object into the data storages;

step 330 of deleting or removing a product allocation data object from the data storages;

step 360 of updating a product allocation data object by updating characteristic values or time series.

After the processing in steps 320, 330 and 360 the process goes to step 400 in which the product allocation data object is unlocked. Now, the product allocation data object may be accessed and processed by other computer systems.

If the product allocation data object has not to be locked, the process continues with step 340 or 350 wherein step 340 comprises reading a requested product allocation data object from the data storages; and step 350 comprises searching the data storages for one or more product allocation data objects according to one or more search criteria;

The results of this process are provided via interface 40 (FIG. 1 and FIG. 2) to the participants 4 (FIG. 1) and the computer systems 20 (FIG. 2).

Locking and unlocking of product allocation data objects is managed by a lock management which manages a list of locked product allocation data objects. The lock management inserts the key ID which represents a product allocation data object into a locking-list. After processing the product allocation data object, the ID is removed form the locking-list.

The interface provides two methods for locking and unlocking a product allocation data object. These two methods are called explicitly by the computer systems, if they are calling methods which perform write accesses to a product allocation data object e.g. update. For inserting a new product allocation data object, which is performed by the framework, the locking mechanism is performed implicitly be the insert method. For methods which access the product allocation data objects only in a read mode, locking and unlocking of product allocation data objects is not necessary.

In a preferred embodiment, the memory for the product allocation data objects is managed by the product allocation management software 50, shown in FIGS. 2 and 4.

Figure 6:
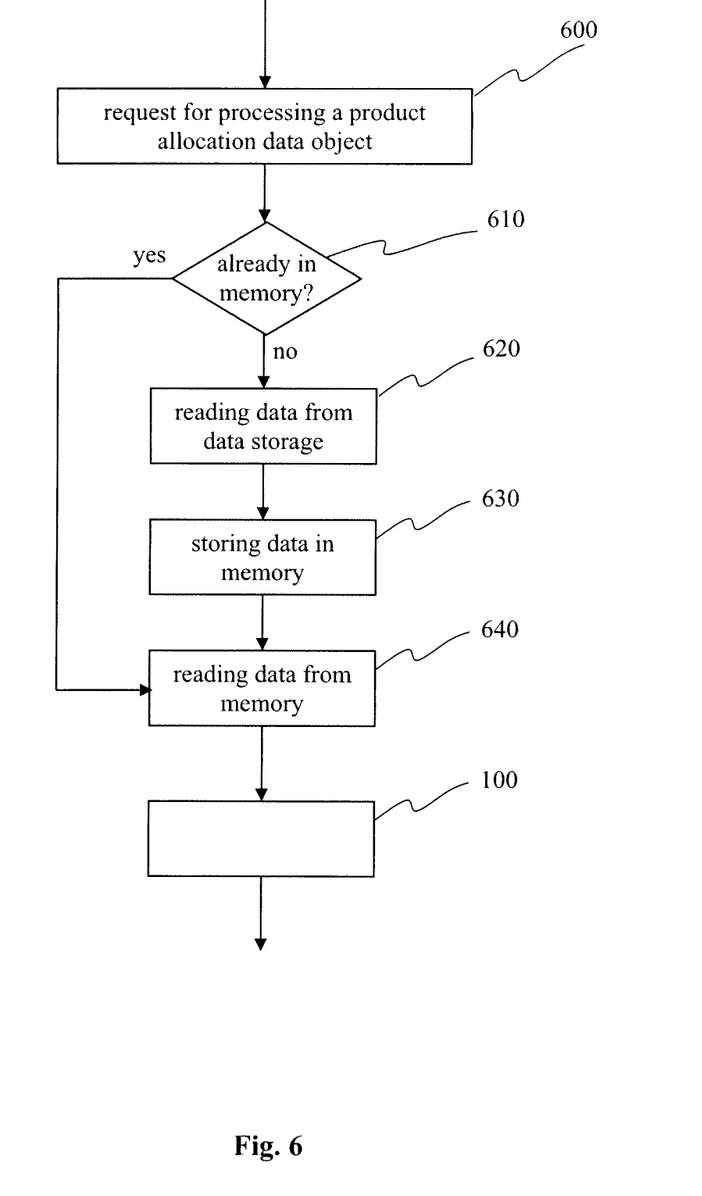
FIG. 6 illustrates a product allocation data object assigned to a product.

The program flow for this embodiment is shown in FIG. 6. In step 600 a request for processing a product allocation data object is received. In the next step 610, it is determined whether the requested product allocation data object together with the respective time series is already stored in the memory.

In case that the product allocation data object is yet in the memory the process goes to step 640 in which the required data from the memory is read. The following process 100, e.g. inserting of FIG. 5, works on this data read from the memory.

In case that the product allocation data object is not yet in the memory the process goes to step 620 in which the product allocation data object together with the assigned time series from the data storages are read.

The following step 630 comprises storing the read product allocation data object and time series in the memory which is managed by the product allocation management software 50.

The process continues with step 640.

Reading the product allocation data objects from the memory leads to a better performance than reading the product allocation data objects from the data storages.

In another embodiment it may be meaningful to move only the required or viewed part of the time series from the data storages into the memory. This approach may lead to a good balance between performance and memory efficiency.

With this invention a flexible interface, which allows performing a collaborative planning process between a plurality of participants of the supply chain for a plurality of product allocation data objects, is provided.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

The invention claimed is:

1. A computer-implemented framework for maintaining product allocation data objects within an e-business system, the framework comprising:
    a plurality of product allocation data objects which are representative of allocations of products, each product allocation data object assigned to a product;
    a plurality of software modules each software module to provide access to at least one of the plurality of product allocation data objects wherein each product allocation data object is processed by one of the plurality of software modules;
    a plurality of computer systems;
    an interface to access the plurality of software modules to provide concurrent access for the plurality of computer systems to the plurality of software modules; and
    a plurality of data storages to store each product allocation data object in a data structure within at least one of the data storages.

2. The computer-implemented framework of claim 1, wherein a product allocation data object comprises:

a plurality of combinations of characteristic values; and a plurality of time series, wherein a combination of characteristic values is identified by an allocation planning identifier.

3. The computer-implemented framework of claim 2, wherein a product allocation data object is configurable in its combination of the plurality of characteristic values.

4. The computer-implemented framework of claim 3, wherein the framework automatically generates a new data structure and a new software module for a new configured product allocation data object.

5. The computer-implemented framework of claim 2, wherein the plurality of software modules comprise at least one of the following:
   method for updating a product allocation data object by updating the corresponding combination of characteristic values and time series;
   method for reading product allocation data objects by reading the corresponding combination of characteristic values and time series;
   method for searching the plurality of data storages for at least one product allocation data object according to one or more search criteria;
   method for locking a product allocation data object; and
   method for unlocking a product allocation data object.

6. The computer-implemented framework of claim 1 further comprising: a communication network interconnecting the plurality computer systems and the interface to access the software modules.

7. The computer-implemented framework of claim 1, wherein a product allocation data object further comprises a plurality of allocation planning objects.

8. The computer-implemented framework of claim 5, wherein a time series comprises:
   an allocation planning ID;
   one or more time periods;
   a number representative of the planned allocation quantity of a product; and
   a number representative of the sold quantity of a product.

9. The computer-implemented framework of claim 1, wherein a product allocation data object is loaded together with the assigned characteristic combinations and time series from the data storages into a memory during the first access by one of the software modules.

10. The computer-implemented framework of claim 9, wherein a product allocation data object is read together with the assigned characteristic combinations and time series from the memory during further accesses by one of the software modules.

11. The computer-implemented framework of claim 1, wherein the e-business system comprises at least one of procurement systems, sales information systems, purchasing information systems, logistics information systems and supply chain management systems.

12. The computer-implemented framework of claim 1, where in the interface permits participants at different levels of a supply chain to each maintain a subset of the allocation data objects in a centralize supply chain management system.

* * * * *